(12) United States Patent
Brunson et al.

(10) Patent No.: US 7,013,781 B2
(45) Date of Patent: *Mar. 21, 2006

(54) BEVEL LOCKING SYSTEM FOR A SLIDING COMPOUND MITER SAW

(75) Inventors: Mark E. Brunson, Abingdon, MD (US); William R. Stumpf, Kingsville, MD (US); Adan Ayala, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/624,825

(22) Filed: Jul. 22, 2003

(65) Prior Publication Data

US 2004/0216575 A1 Nov. 4, 2004

Related U.S. Application Data

(63) Continuation of application No. 09/481,272, filed on Jan. 11, 2000, now Pat. No. 6,631,661, which is a continuation of application No. 09/057,708, filed on Apr. 9, 1998, now Pat. No. 6,032,562, which is a continuation-in-part of application No. 08/761,730, filed on Dec. 5, 1996, now Pat. No. 5,870,938.

(60) Provisional application No. 60/008,512, filed on Dec. 12, 1995.

(51) Int. Cl.
*B24D 16/00* (2006.01)

(52) U.S. Cl. .................. 83/471.3; 83/473; 83/581; 83/699

(58) Field of Classification Search ............ 83/471.3, 83/473, 581, 699, 699.51, 698.51, 471, 471.2, 83/477, 477.1, 477.2, 485
See application file for complete search history.

(56) References Cited

U.S. PATENT DOCUMENTS 1,030,229 A * 6/1912 Cheney ................ 303/56
1,332,881 A * 3/1920 Bommer ............... 16/279
1,646,589 A * 10/1927 Meek et al. .......... 83/471.3

(Continued)

FOREIGN PATENT DOCUMENTS

DE 2929932 * 2/1980

(Continued)

*Primary Examiner*—M. Rachuba
(74) *Attorney, Agent, or Firm*—Adan Ayala

(57) ABSTRACT

A power tool includes a table. A shaft is disposed on the table and has an axis. A support housing supporting a motor and a working tool driven by the motor is disposed on the shaft adjacent to the table. The support housing is axially movable along the shaft and being laterally pivotable about an axis of rotation. A locking mechanism is further provided for locking the support housing at a predetermined lateral position, wherein the locking mechanism may include a handle disposed on the shaft, the handle being rotatable in two directions with respect to the table, such that, upon rotation of the handle in both directions from a neutral position, the handle urges the support housing into contact with the table. The shaft may be rotatable relative to the table. The locking mechanism may further include a first camming surface disposed on the table and a second camming surface disposed on the shaft and engaging the first camming surface. Alternatively, the shaft may include a first surface having a first thread disposed thereon in a first orientation, and a second surface having a second thread disposed thereon in a second orientation, the first and second thread intersect forming a V-shaped thread. The table may then include at least one protrusion slidable along the first and second threads.

10 Claims, 11 Drawing Sheets

U.S. PATENT DOCUMENTS

| | | | |
|---|---|---|---|
| 4,152,961 A * | 5/1979 | Batson | 83/471.3 |
| 4,221,051 A * | 9/1980 | Glass | 30/377 |
| 4,452,117 A * | 6/1984 | Brickner et al. | 83/468 |
| 4,537,105 A * | 8/1985 | Bergler | 83/471.3 |
| 4,658,681 A * | 4/1987 | Pollak et al. | 82/115 |
| 4,804,170 A * | 2/1989 | Young et al. | 267/279 |
| 4,869,142 A * | 9/1989 | Sato et al. | 83/467.1 |
| 4,934,233 A * | 6/1990 | Brundage et al. | 83/397 |
| 5,054,352 A * | 10/1991 | Fushiya et al. | 83/468.3 |
| 5,060,548 A * | 10/1991 | Sato et al. | 83/471.3 |
| 5,146,826 A * | 9/1992 | Shiotani et al. | 83/468.2 |
| 5,216,964 A * | 6/1993 | Sato et al. | 83/471.3 |
| 5,235,889 A * | 8/1993 | Brickner et al. | 83/471.3 |
| 5,249,496 A * | 10/1993 | Hirsch et al. | 83/471.3 |
| 5,257,570 A * | 11/1993 | Shiotani et al. | 83/471.3 |
| 5,329,678 A * | 7/1994 | Bagnasco | 24/709.4 |
| 5,404,779 A * | 4/1995 | Break | 83/471.3 |
| 5,437,214 A * | 8/1995 | Sasaki et al. | 83/471.3 |
| 5,582,089 A * | 12/1996 | Sasaki et al. | 83/471.3 |
| 5,660,094 A * | 8/1997 | Sasaki et al. | 83/471.3 |
| 5,802,943 A * | 9/1998 | Brunson et al. | 83/471.3 |
| 5,870,938 A * | 2/1999 | Brunson et al. | 83/471.3 |
| 6,032,562 A * | 3/2000 | Brunson et al. | 83/471.3 |

FOREIGN PATENT DOCUMENTS

| | | | |
|---|---|---|---|
| DE | 3040500 | * | 6/1982 |
| DE | 3640784 | * | 3/1988 |
| DE | 3744716 | * | 12/1990 |
| EP | 0570904 | * | 11/1993 |

* cited by examiner

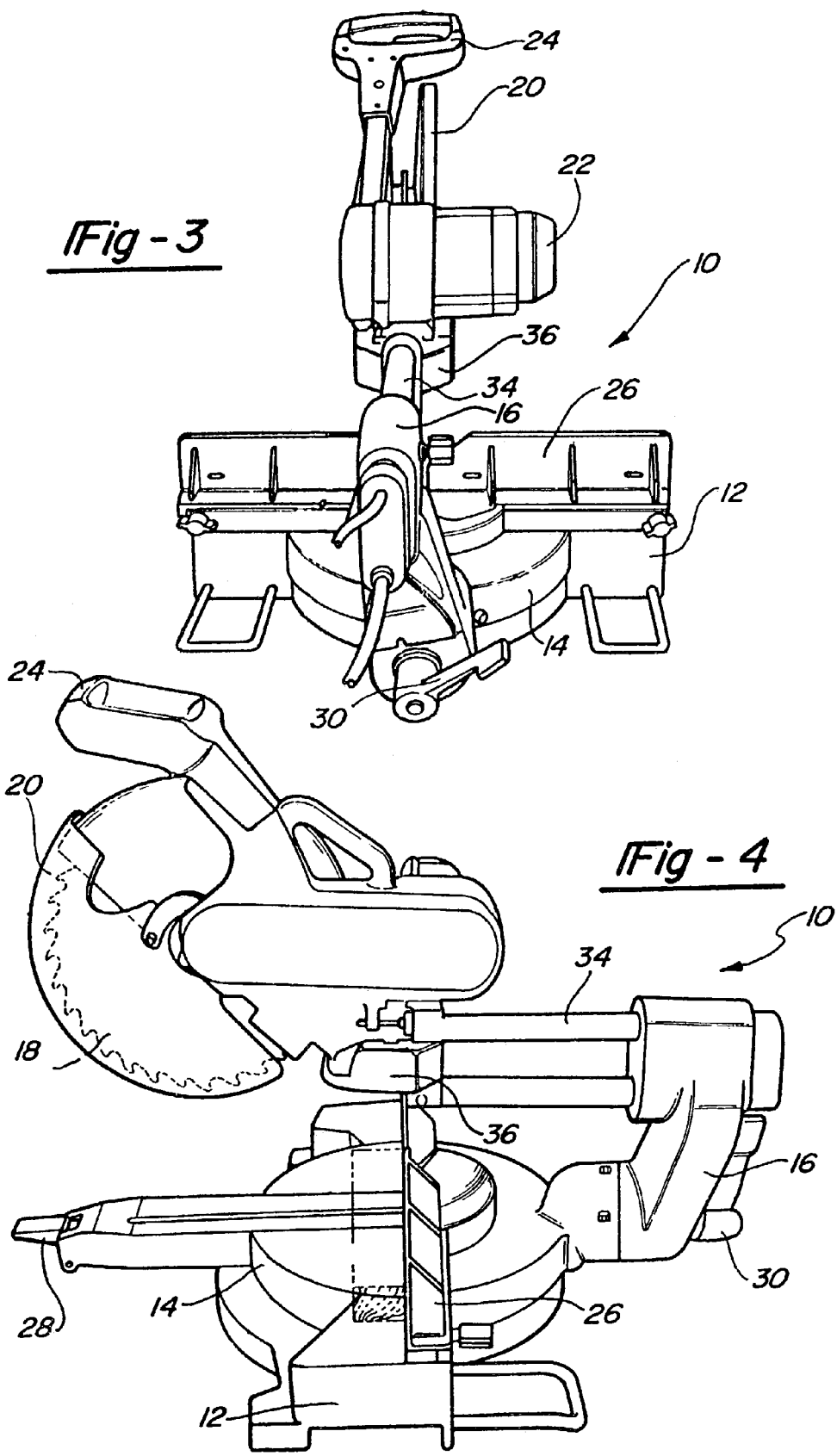

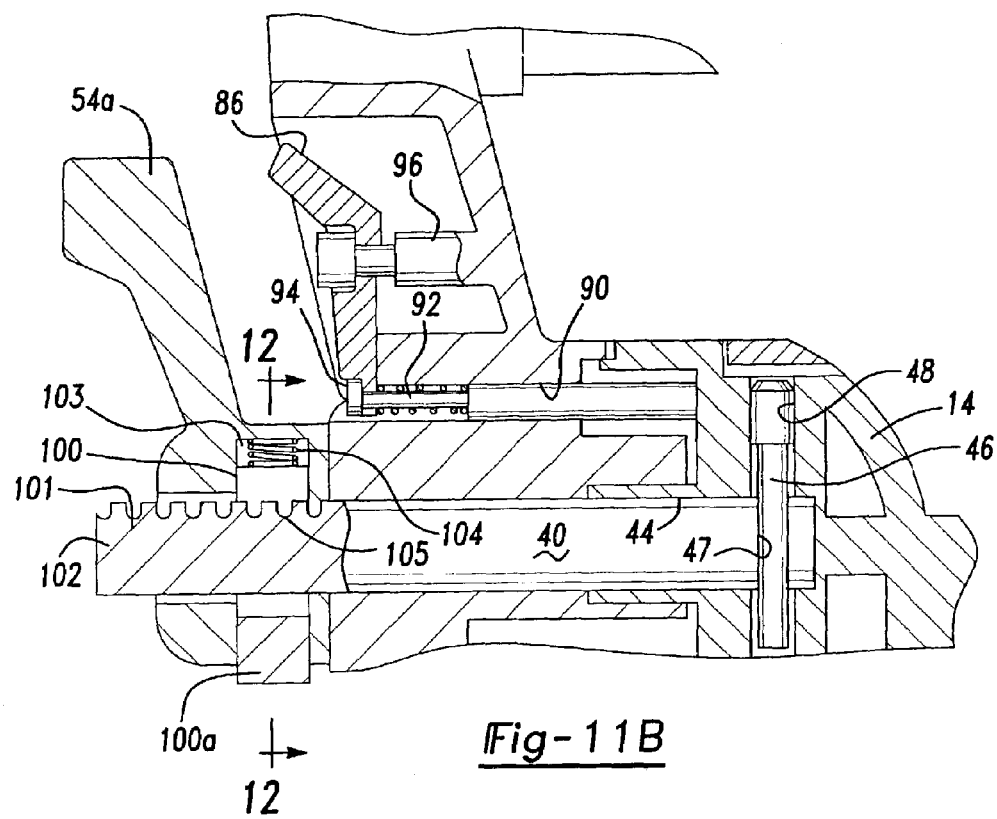
*Fig-11B*
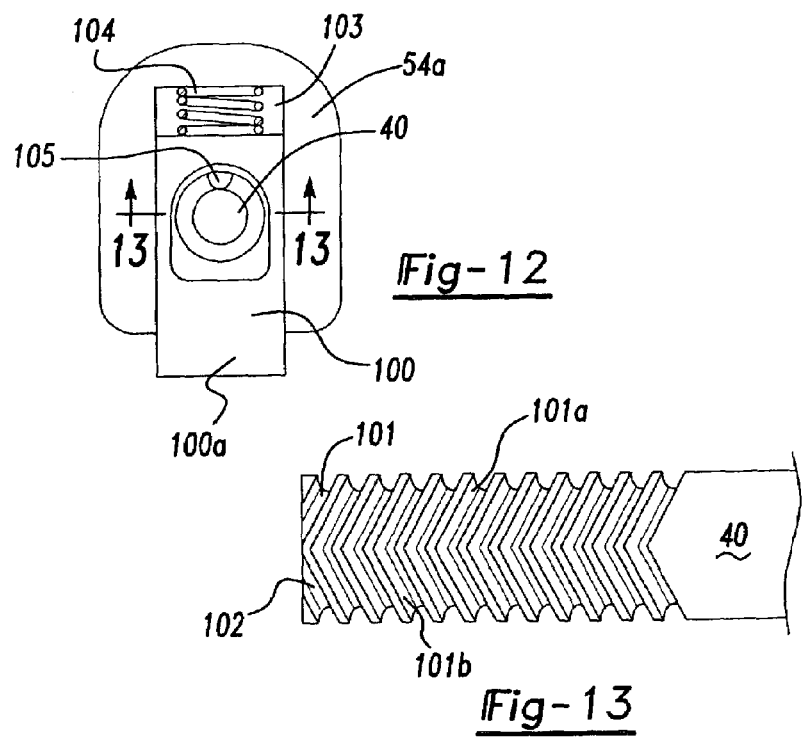
*Fig-12*
*Fig-13*

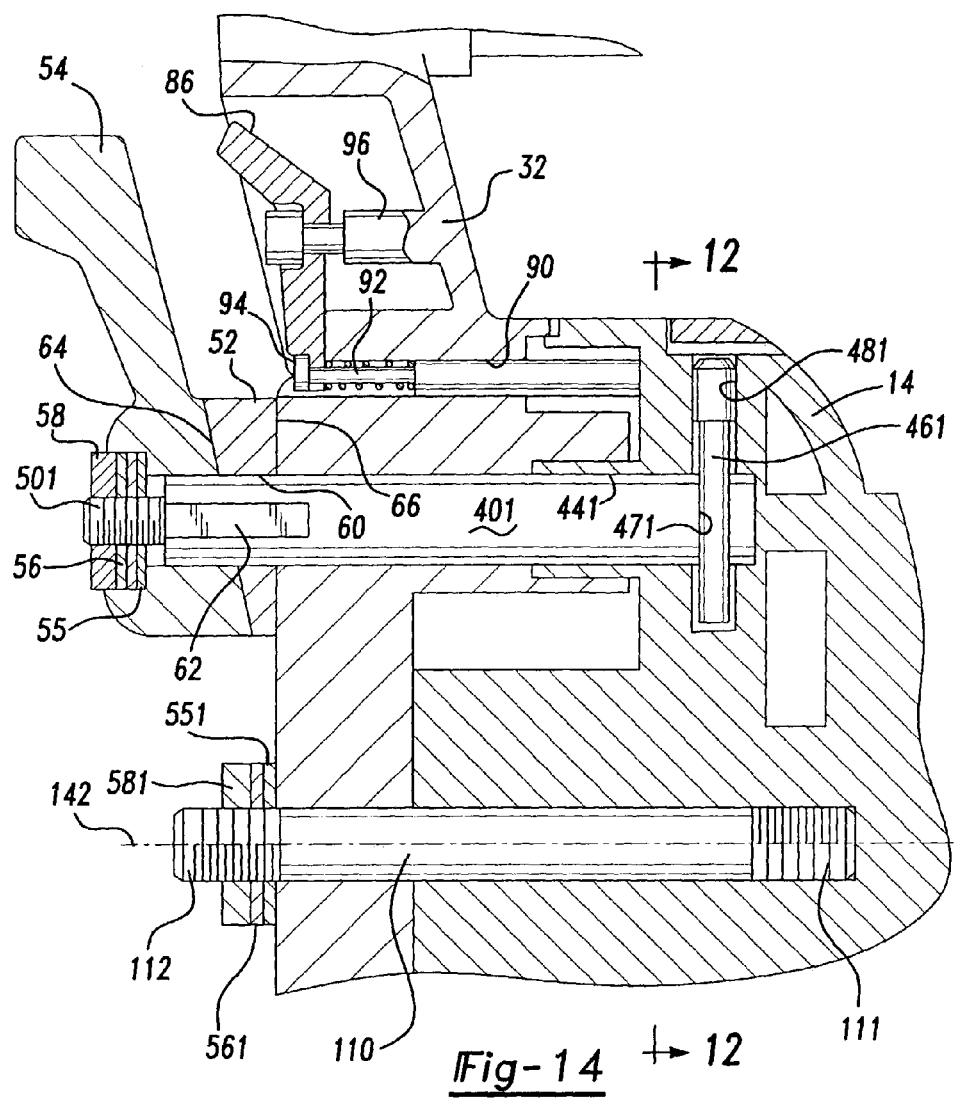
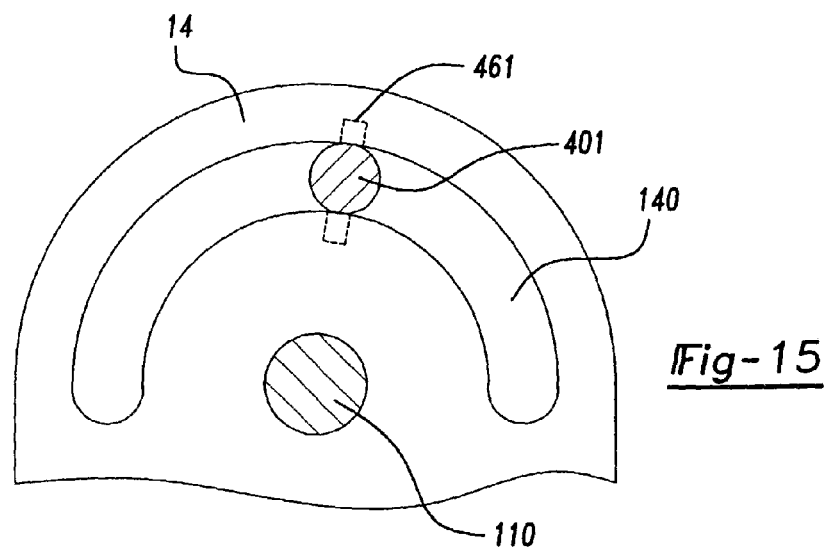
Fig-14
Fig-15

BEVEL LOCKING SYSTEM FOR A SLIDING COMPOUND MITER SAW

This application is a continuation of U.S. Ser. No. 09/481,272, filed Jan. 11, 2000, now U.S. Pat. No. 6,631,661, which is a continuation of U.S. Ser. No. 09/057,708, filed Apr. 9, 1998, now U.S. Pat. No. 6,032,562, which is a continuation-in-part of U.S. Ser. No. 08/761,730, filed Dec. 5, 1996, now U.S. Pat. No. 5,870,938; which claims the benefit of U.S. Provisional Application No. 60/008,512, filed Dec. 12, 1995, now abandoned.

FIELD OF THE INVENTION

The present invention relates to compound miter saws or other power operated equipment or machinery utilizing a cutter for performing working operations on a workpiece. More particularly, the present invention relates to improvements in the bevel lock mechanism for the bevel adjustment for such power operated equipment.

BACKGROUND OF THE INVENTION

Saws and other apparatuses designed for cutting or performing other working operations on a workpiece typically require adjustment mechanisms for moving the saw blade or cutting tool into an angular relationship to the workpiece. Examples of such equipment include cross-cut compound miter saws which are adapted for allowing the user to selectively move the saw blade into any of a number of positions or modes for square cutting, miter cutting, bevel cutting, or compound miter cutting where a combination miter angle and bevel angle are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal or other materials.

In order to allow for the adjustment in the miter and the bevel angle, the saw blade, cutter or other working device is angularly adjustable with respect to a horizontal base and a vertical fence against which the workpiece is positioned. The miter adjustment allows the saw blade, cutter or other working device to move angularly with respect to the vertical fence while maintaining perpendicularity with the horizontal base. The bevel adjustment allows the saw blade, cutter or other working device to move angularly with respect to the horizontal base while maintaining perpendicularity with the vertical fence. At times it may be desirable to cut a combination miter angle and bevel angle by simultaneously adjusting the angularity of the blade with respect to both the horizontal base and the vertical fence.

Once the saw blade, cutter or other working device has been adjusted to the desired position with respect to the horizontal base and the vertical fence, locking mechanisms for the miter and bevel adjustment must be activated in order to prohibit movement of the saw blade, cutter or other working device with respect to the base and fence while the cutting operation is performed. These locking mechanisms need to be easily activated, adjustable and quick acting in order to optimize the efficiency of the cutting apparatus and provide convenience to the operator of the apparatus.

SUMMARY OF THE INVENTION

In accordance with the present invention, an improved bevel lock is employed in a power tool. The power tool comprises a table. A shaft is disposed on the table. The power tool also has a support housing supporting a motor and a working tool driven by the motor. The support housing is disposed on the shaft adjacent to the table and is axially movable along the shaft and laterally pivotable about an axis of rotation. In addition, the power tool has a locking mechanism for locking the support housing at a predetermined lateral position, wherein the locking mechanism comprises a handle disposed on the shaft. The handle is rotatable in two directions with respect to the table, such that, upon rotation of the handle on either direction from a neutral position, the handle urges the support housing into locking contact with the table.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a rear elevational view of the sliding compound miter saw shown in FIGS. 1 and 2;

FIG. 4 is a side elevational view of the sliding compound miter saw shown in FIGS. 1 through 3;

FIGS. 11A and 11B are cross-sectional side views of a third and fourth embodiments of the bevel stop mechanism;

FIG. 12 is a cross-sectional rear view along line A—A of FIG. 11B;

FIG. 13 is a top view of the shaft along line B—B of FIG. 12;

FIG. 14 is a cross-sectional side view of a fifth embodiment of the bevel stop mechanism;

FIG. 15 is a cross-sectional rear view along line C—C of FIG. 14;

DETAILED DESCRIPTION OF THE PREFERRED EMBODIMENTS

Figure 1:
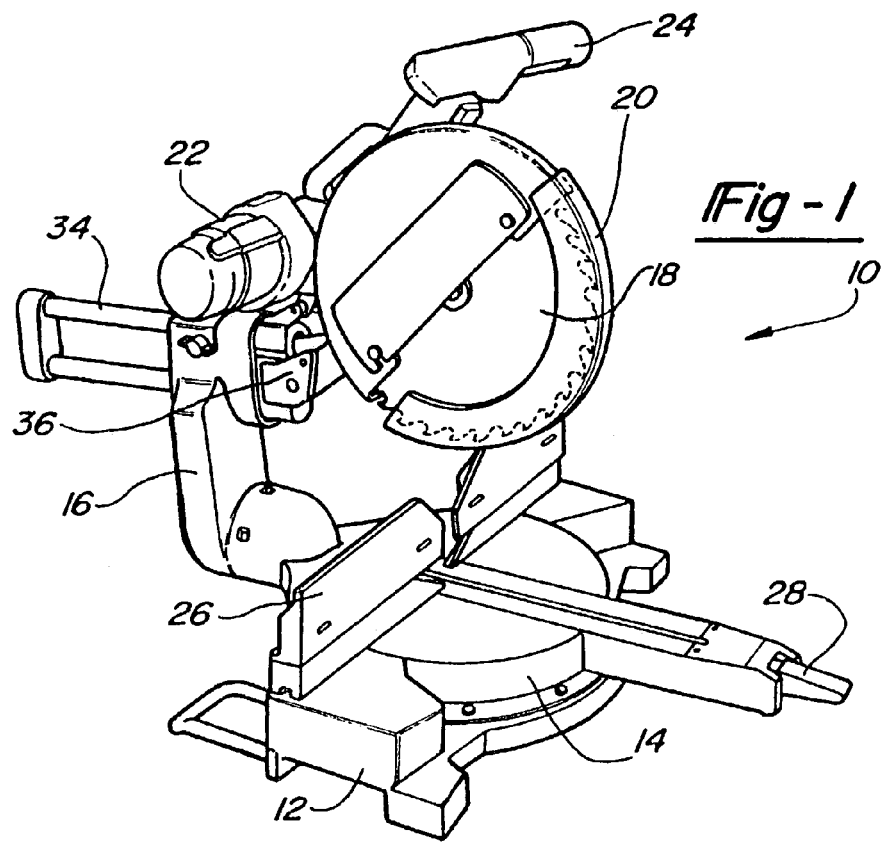
FIG. 1 is a front perspective view of a sliding compound miter saw in accordance with the present invention.
Figure 2:
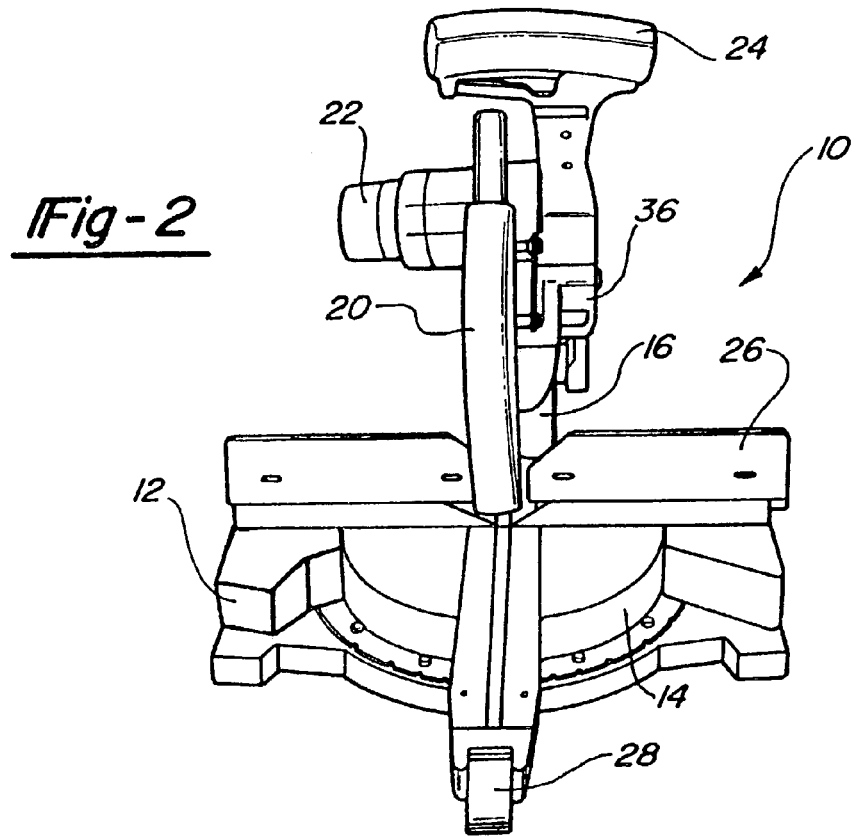
FIG. 2 is a front elevational view of the sliding compound miter saw shown in FIG. 1.

Referring now to the drawings in which like reference numerals designate like or corresponding parts throughout the several views, there is shown in FIGS. 1 through 4 an exemplary sliding compound miter saw incorporating a bevel stop mechanism according to the present invention, shown merely for the purposes of illustration, and designated generally by the reference numeral 10. One skilled in the art will readily recognize from the following description, taken in conjunction with the accompanying drawings and claims, that the principles of the present invention are equally applicable to sliding compound miter saws, compound miter saws, chop saws, radial arm saws, table saws, jigsaws, scroll saws, or other saws of types other than that shown for purposes of illustration in the drawings. Similarly, one skilled in the art will readily recognize that the principles of the bevel stop mechanism according to the present invention are also applicable to other types of powered or unpowered equipment for performing an operation on a workpiece. Such equipment includes, but is not limited to, dado saws, spindle shapers or sanders, or other types of powered or unpowered devices that would benefit from the cam locking mechanism of the present invention.

Referring primarily to FIGS. 1 through 4, sliding compound miter saw 10 comprises a base assembly 12, a table assembly 14, a unique housing assembly 16, a saw blade 18, a blade guard 20, a motor 22 drivingly connected to saw blade 18, a handle 24 and a fence assembly 26. Table assembly 14 is secured to base assembly 12 such that it can be rotated in order to provide adjustment for miter cutting. The rotation of table assembly 14 changes the angle of saw blade 18 relative to fence assembly 26 but maintains the perpendicularity of saw blade 18 with table assembly 14. A locking mechanism 28 can be activated in order to lock table assembly 14 to base assembly 12.

Housing assembly 16 is secured to table assembly 14 such that it can be pivoted with respect to table assembly 14 in order to provide adjustment for bevel cutting. As can be appreciated by one skilled in the art, the adjustments for mitering and beveling can be separate or they can be adjusted simultaneously in order to provide a compound miter and bevel cut. The pivoting of housing assembly 16 changes the angle of saw blade 18 relative to table assembly 14 but maintains the perpendicularity of saw blade 18 with respect fence assembly 26. A locking mechanism 30 can be activated in order to lock housing assembly 16 to table assembly 14 at any desired bevel angle.

Referring to FIGS. 1 through 5, housing assembly 16 includes support housing 32, which mounts a pair of support arms 34 for sliding movement with respect to housing 32. Saw blade 18, blade guard 20, motor 22 and handle 24 are all mounted to a drive housing 36 which is pivotably secured to support arms 34. The pivoting of drive housing 36 downward towards table assembly 14 operates to open blade guard 20 and cut a workpiece which is supported by table assembly 14 and fence assembly 26. The sliding movement of support arm 34 relative to housing 32 permits drive housing 36 and thus saw blade 18 to be pulled through the workpiece when the size of the workpiece exceeds the cutting width of saw blade 18.

Referring now to FIGS. 5 through 8, support housing 32 is pivotably supported with respect to table assembly 14 on a steel shaft 40 which is secured to table assembly 14 and extends rearwardly from table assembly 14 to define a pivot axis 42 for support housing 32. Shaft 40 is inserted into a complimentary bore 44 located within table assembly 14 and is secured in place using a cross pin 46 which extends through a bore 47 extending through shaft 40 and a corresponding set of bores 48 located within table assembly, 14 and being generally perpendicular to and extending into bore 44. The end of shaft 40 opposite to the end defining bore 46 includes a threaded stub 50 for retaining and adjusting locking mechanism 30 as will be described later herein.

Persons skilled in the art will recognize that the shaft 40 can be fixed to the table assembly 14 using other means. For example, the shaft 40 can be soldered or screwed unto the table assembly 14. Similarly, the shaft 40 can be built into the table assembly 14 as a fixed casting.

Locking mechanism 30 comprises a cam 52, a handle 54, a thrust bearing 55, a plurality of washers 56 and a locknut 58. Once support housing 32 is slidingly and pivotably received on shaft 40, cam 52 is slidingly positioned on shaft 40 adjacent support housing 32. Cam 52 includes a D-shaped through bore 60 which mates with a corresponding D-shaped portion 62 of shaft 40 such that cam 52 is allowed to move axially along portion 62 of shaft 40 but rotation of cam 52 with respect to shaft 40 is prohibited. Cam 52 further includes an angular camming surface 64 having a plurality of ramps which is located on the radial surface of cam 52 which is opposite to support housing 32. Camming surface 64 is designed to mate with handle 54 as will be described later herein.

Handle 54 is slidingly and rotatably positioned on shaft 40 adjacent to and outboard of cam 52. Handle 54 includes an angular camming surface 66 having a plurality of ramps which mates with angular camming surface 64 on cam 52. Support housing 32, cam 52 and handle 54 are retained on shaft 40 by thrust washer 55, the plurality of washers 56 and locknut 58 which is threadingly received on stub 50 of shaft 40.

Figure 7:
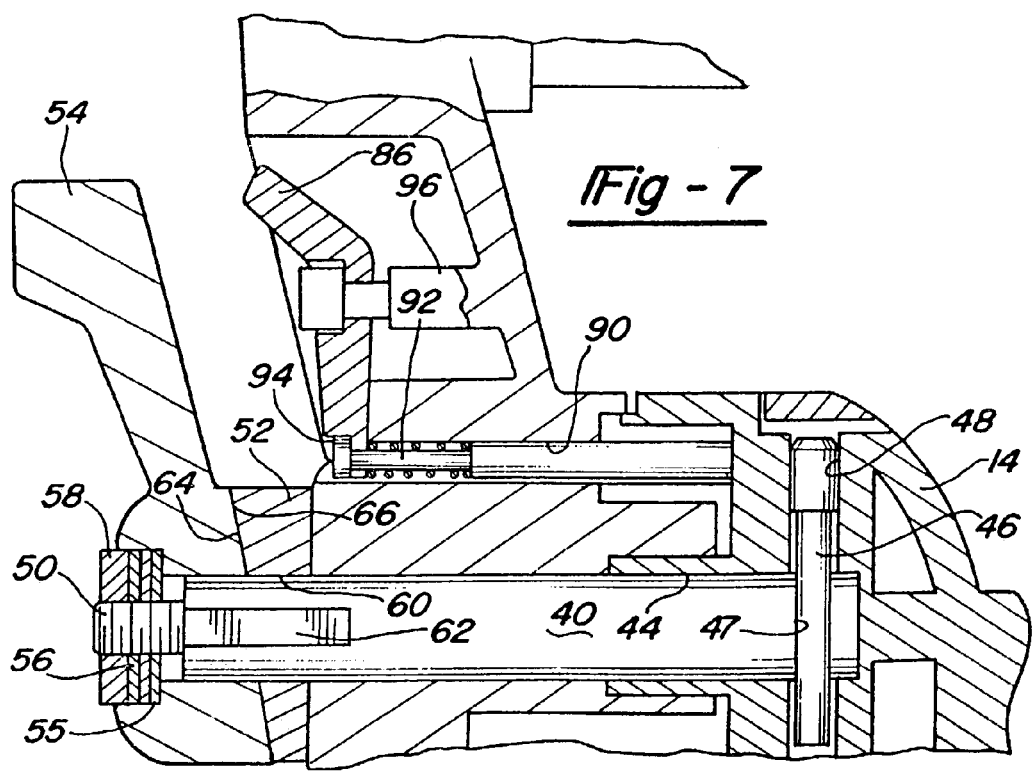
FIG. 7 is a cross-sectional side view of the first embodiment of the bevel stop mechanism shown in FIG. 5.
Figure 8:
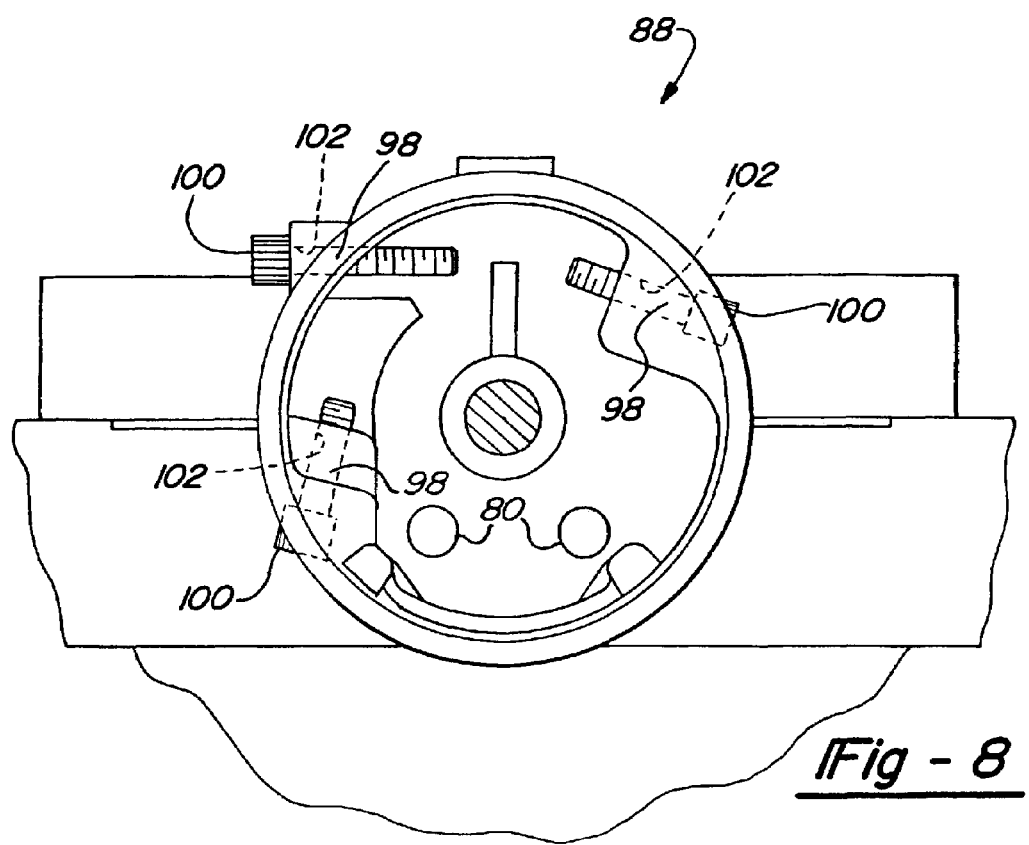
FIG. 8 is an end view of the base or table assembly illustrating a first embodiment of the adjustment feature provided for the bevel stop mechanism shown in FIG. 5.

When angular camming surface 64 and angular camming surface 66 are in full contact with each other as shown in FIG. 7, support housing 32 is free to pivot on shaft 40 to change the bevel angle of saw blade 18. Once the desired bevel angle has been set, handle 54 is rotated with respect to shaft 40. Rotation of handle 54 mis-aligns camming surfaces 64 and 66 pushing support housing 32 and cam 52 axially along shaft 40. Support housing 32 contacts table assembly 14 and continued rotation of handle 54 forces support housing 32 into table assembly 14 locking the two components together. The locking of the two components together can be accomplished by rotating handle 54 in either a clockwise or a counter clockwise direction on order to misalign camming surfaces 64 and 66. This bi-directional locking ability of handle 54 simplifies the adjustment of the bevel angle on opposite sides of center. An indicator plate 68 is bolted to support housing 32 to allow the user to set a specific bevel angle. Indicator plate 68 is provided with a pair of slots which allow for the zero adjustment of plate 68 as is well known in the art.

Persons skilled in the art will recognize that other camming surfaces on handle 54 and cam 52 may be provided to obtain the result described above. Persons skilled in the art are referred to the parent applications, which are hereby incorporated by reference.

Figure 9:
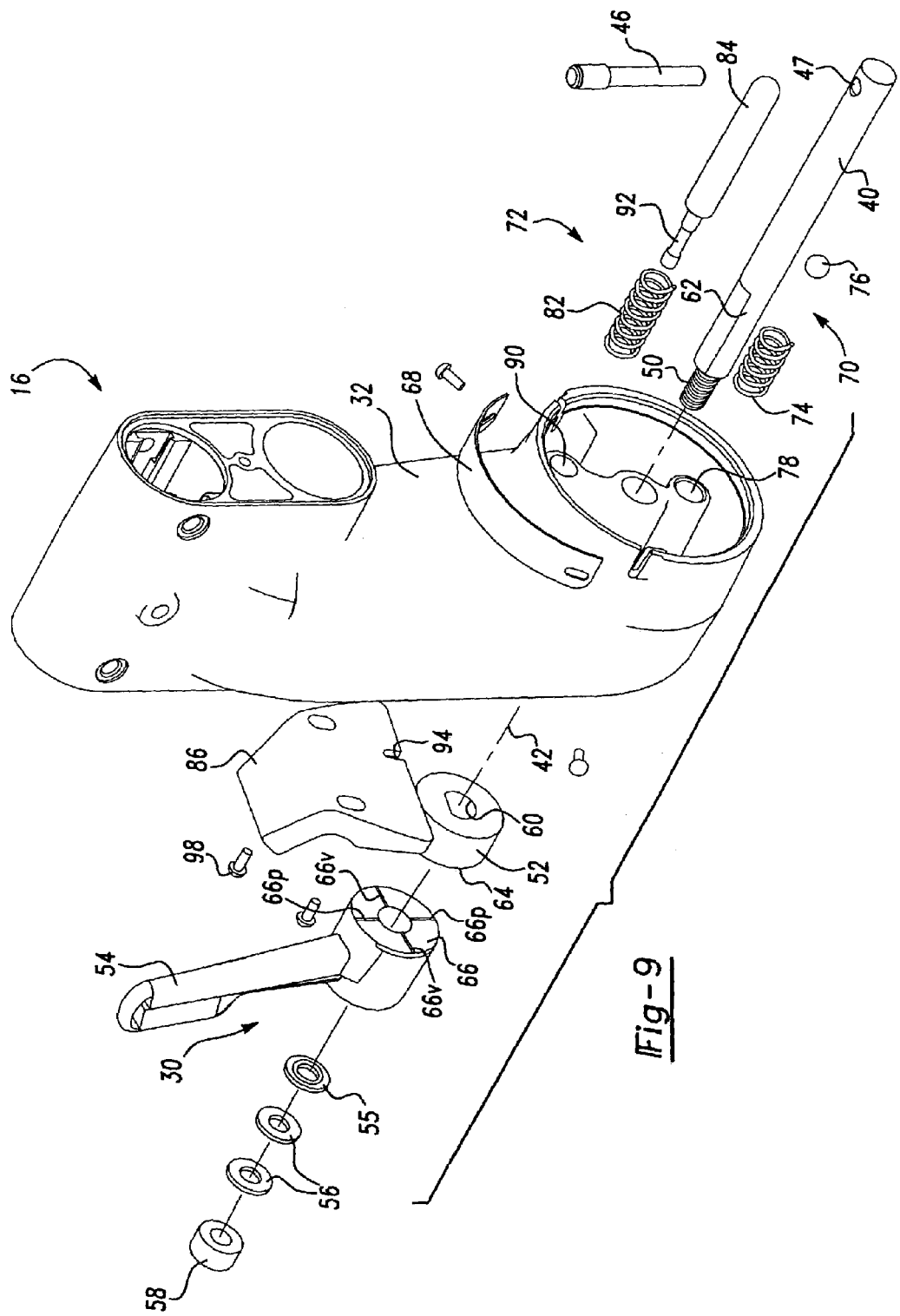
FIG. 9 is an exploded perspective view of a second embodiment of the bevel stop mechanism in accordance with the present invention.
Figure 10:
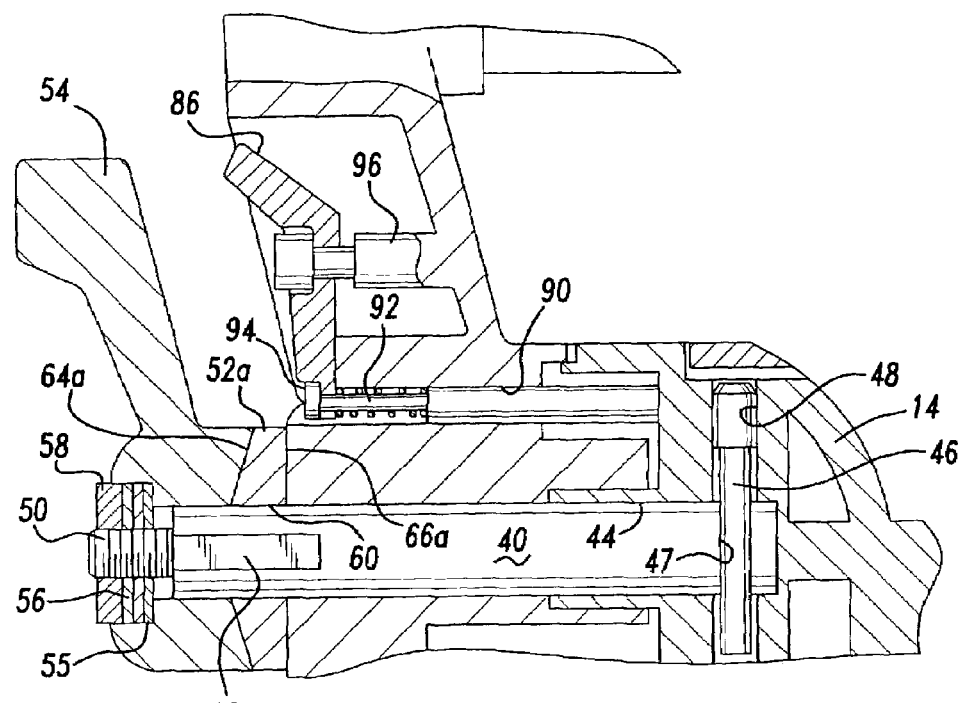
FIG. 10 is a cross-sectional side view of the second embodiment of the bevel stop mechanism shown in FIG. 9.

For example, FIGS. 9 and 10 illustrate a second embodiment of the bevel locking mechanism is illustrated. Unlike the prior embodiment, the handle 54 is provided with a camming surface 66a which mates with camming surface 64a on cam 52a. As shown in FIG. 9, the camming surface 66a is provided with peaks 66p and valleys 66v. Camming surface 64a has corresponding peaks and valleys in order to mate with camming surface 66a. Having the multiple peaks and valleys helps in evenly distributing the camming force. Nevertheless, the arrangement and operation of the second embodiment is similar to the one illustrated in FIGS. 5 to 7. In addition, the operator is still able to lock the housing 32 and the table assembly 14 together by rotating handle 54 in either a clockwise or a counter clockwise direction.

Furthermore, persons skilled in the art will recognize that cam 52 may be integrated with the support housing 32. This is especially advantageous as less parts are necessary for manufacture, while still allowing the operator to lock the housing 32 and the table assembly 14 together by rotating handle 54 in either a clockwise or a counter clockwise direction.

FIGS. 11A to 13 illustrate a third and fourth embodiments of the bevel lock mechanism, where like numerals refer to like parts with like functions. In both embodiments the shaft 40 is provided with a "double screw" portion 102. As shown in FIG. 13, on one side of the double screw portion 102, a set of threads 101a are disposed thereon in a first orientation. In addition, on the other side of the double screw portion 102, a second set of threads 101b are disposed thereon in a second orientation. The threads 101a and 101b intersect to form V-shaped threads 101. Preferably, the resulting threads 101 will have a low pitch, so that more travel along the axis of the rod can be obtained with a smaller amount of rotation.

The handle 54a has protrusions 105 to engage the threads 101, as shown in FIG. 14A. These protrusions 105 slide along the threads 101, as the handle 54a is rotated, forcing the handle 54a to travel along shaft 40. This in turn forces the handle 54a towards the support housing 32, thus clamping the support housing 32 in place between handle 54a and table assembly 14. Accordingly, the rotational motion of handle 54a is translated into a linear motion along shaft 40, causing the clamping action.

Figure 11A:
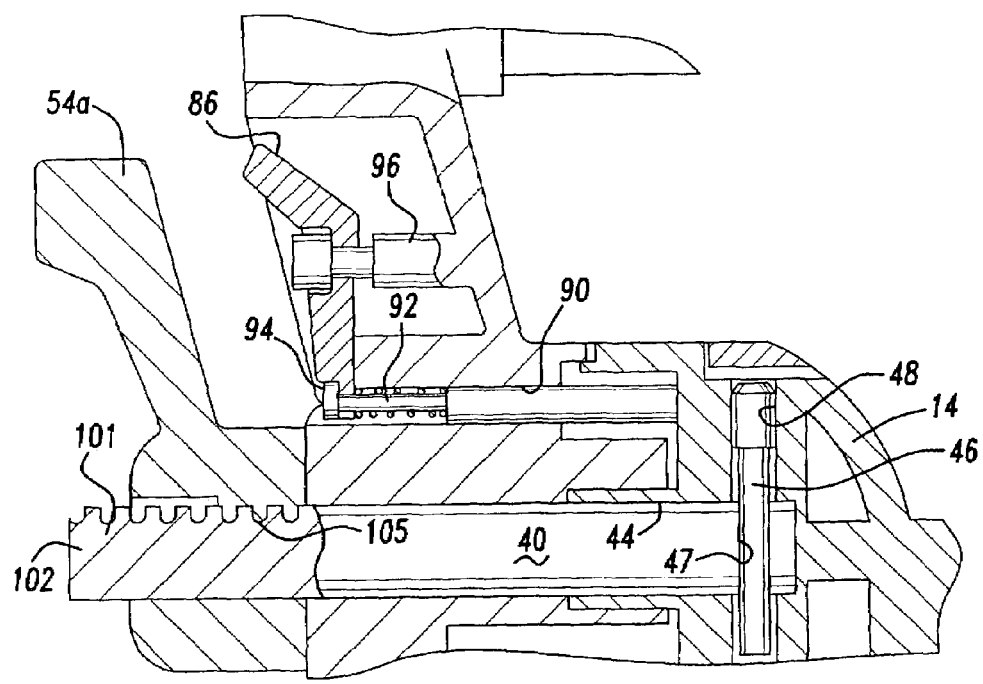

As shown in FIGS. 11A and 11B, the protrusions 105 preferably match the profile of the threads 101, allowing travel along threads 101. Accordingly if the thread 101 is rounded, the protrusions 105 are preferably rounded. Persons skilled in the art will nevertheless recognize that any profile of protrusions 105 will be acceptable so long as the protrusions 105 can slide along the threads 101.

Preferably, the protrusions 105 are disposed on a button 100, as shown in FIG. 11B. It is also advantageous to provide a spring 104 to bias the button 100 into contact with the double screw portion 102. Accordingly, in order to install handle 54a, an operator need only push gripping portion 100a of the button 100, slide the handle 54a along the shaft 40, and release button 100.

Figure 16:
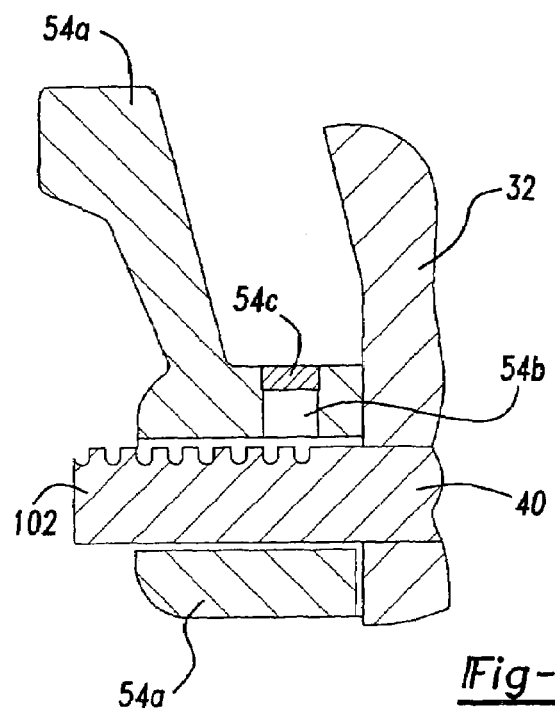
FIG. 16 is a cross-sectional side view of a sixth embodiment of the bevel stop mechanism.

People skilled in the art will recognize that means other than the spring 104 will also allow easy installation and removal of handle 54a. For example, as shown in FIG. 16, the handle 54a may include a thread engaging portion 54b, held in place by a plug 54c. Accordingly, in order to install handle 54a, an operator need only slide the handle 54a along the shaft 40 and insert the thread engaging portion 54b, so that it engages the threads 101. The operator can then insert the plug 54c to hold the thread engaging portion 54b in place.

FIGS. 14 and 15 show yet another embodiment of the bevel lock mechanism. Unlike in the previous embodiments, the locking shaft and the pivot axis are not the same. As shown in FIG. 14, support housing 32 is pivotably supported with respect to table assembly 14 on a shaft 110 which is fixedly secured to table assembly 14 via threads 111. Persons skilled in the art will recognize that other means for fixing the shaft 110 to the table assembly 14 are available. The shaft 110 extends rearwardly from table assembly 14 to define a pivot axis 142 for support housing 32. Preferably, the shaft 110 has a threaded portion 112. A thrust bearing 551, a washer 561 and a locknut 581 are disposed on the shaft 110 in order to retain the housing 32.

In addition, locking shaft 401 is inserted into a complimentary bore 441 located within table assembly 14 and is secured in place using a cross pin 461 which extends through a bore 471 extending through shaft 401 and a corresponding set of bores 481 located within table assembly 14 and being generally perpendicular to and extending into bore 441. The end of shaft 401 opposite to the end defining bore 461 includes a threaded stub 501 for retaining and adjusting a locking mechanism 30, such as the ones described above. As shown in FIG. 14, a slot 140 is provided in the table assembly 14. The shaft 401 is disposed through the slot 140 so that, as the bevel angle is changed, the shaft 401 can travel along the slot 140.

Persons skilled in the art will see that the locking shaft 401 is substantially parallel to shaft 110. However, those persons should recognize that the disclosed embodiment is for exemplary purposes only and that the shafts 401 and 110 need not be parallel to each other.

Figure 5:
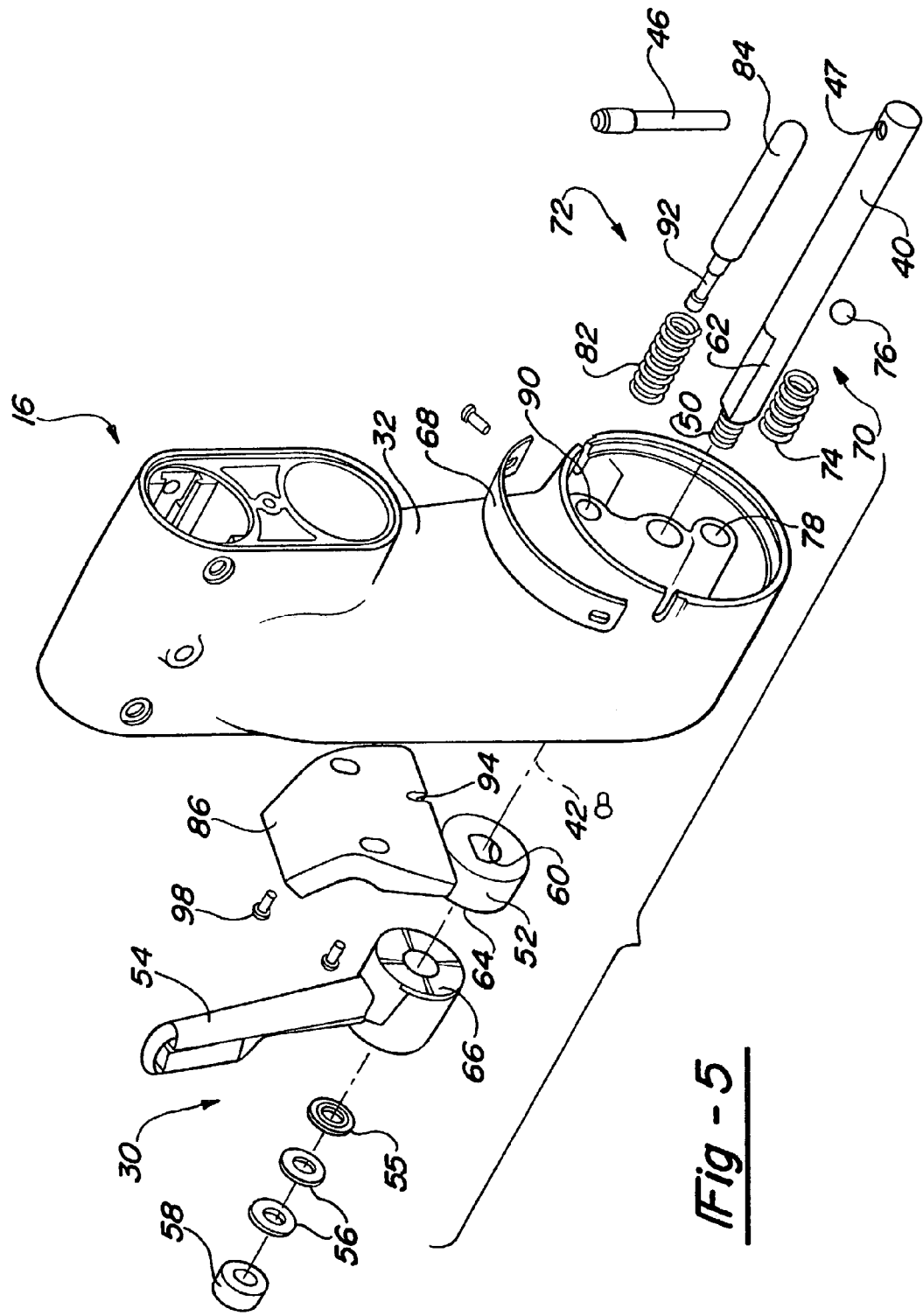
FIG. 5 is an exploded perspective view of a first embodiment of the bevel stop mechanism in accordance with the present invention.
Figure 6:
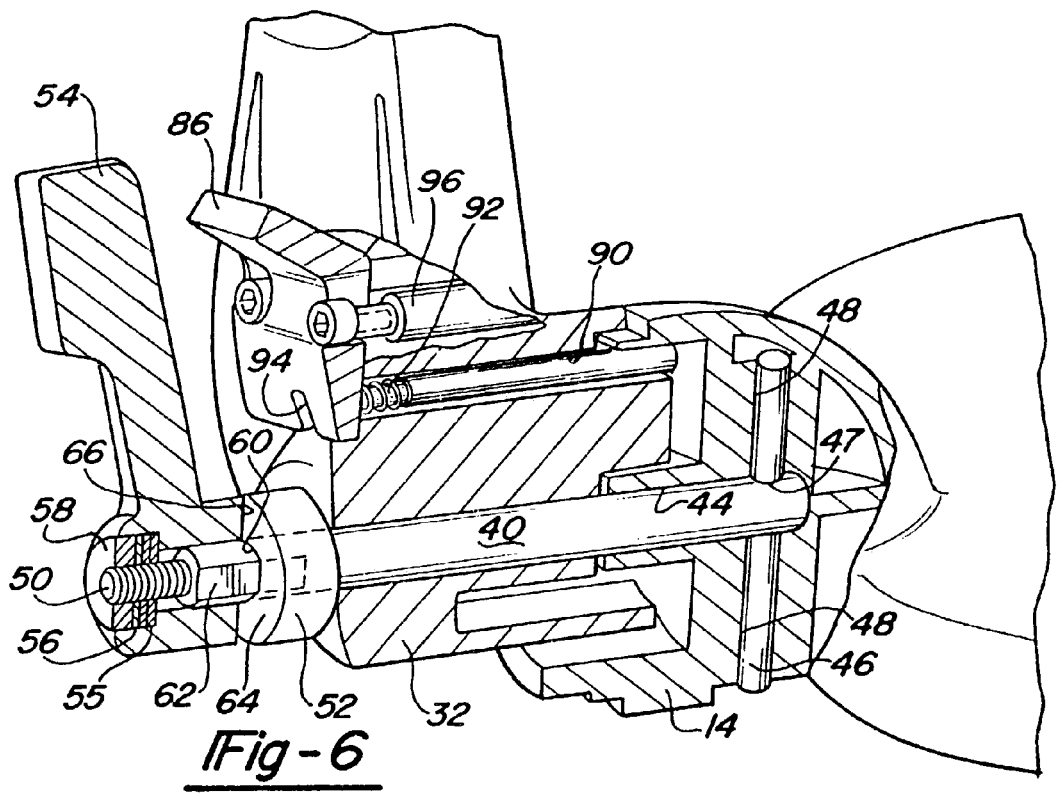
FIG. 6 is an assembled perspective view, partially in cross-section of the first embodiment of the bevel stop mechanism shown in FIG. 5.

As shown in FIG. 14, the locking mechanism 30 shown in FIGS. 5 to 7 can be disposed on the locking shaft 401 and used as described above. However, persons skilled in the art will recognize that any of the different embodiments described above for the locking mechanism can be used instead.

Figure 17:
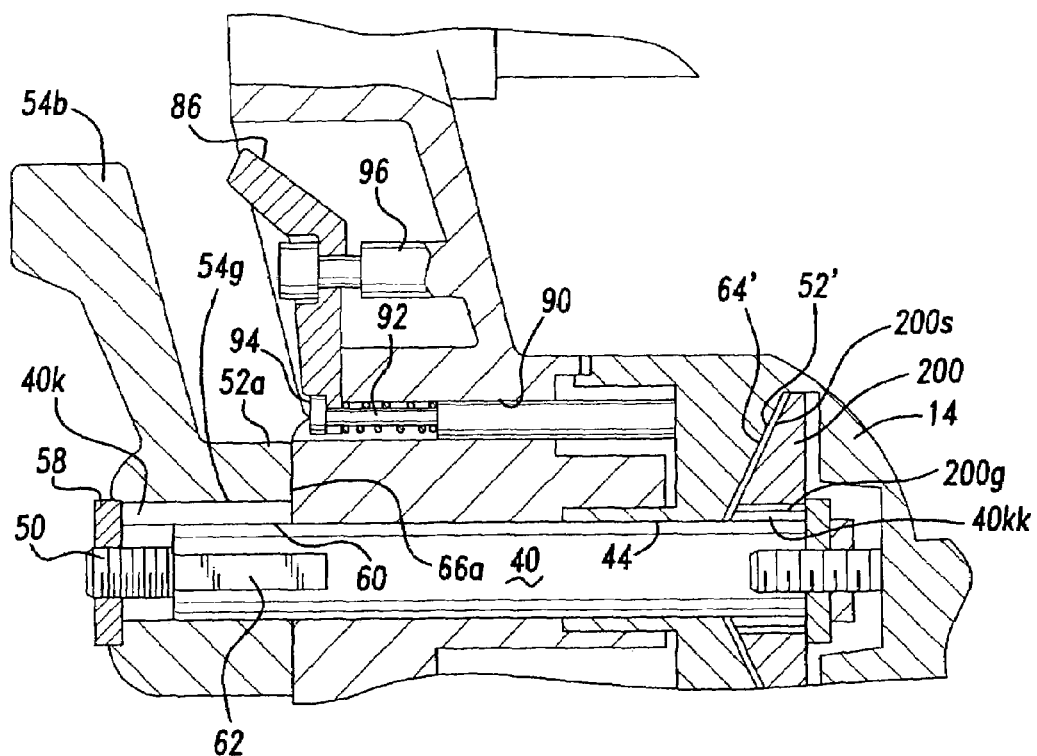
FIG. 17 is a cross-sectional side view of a seventh embodiment of the bevel stop mechanism.
Figure 18:
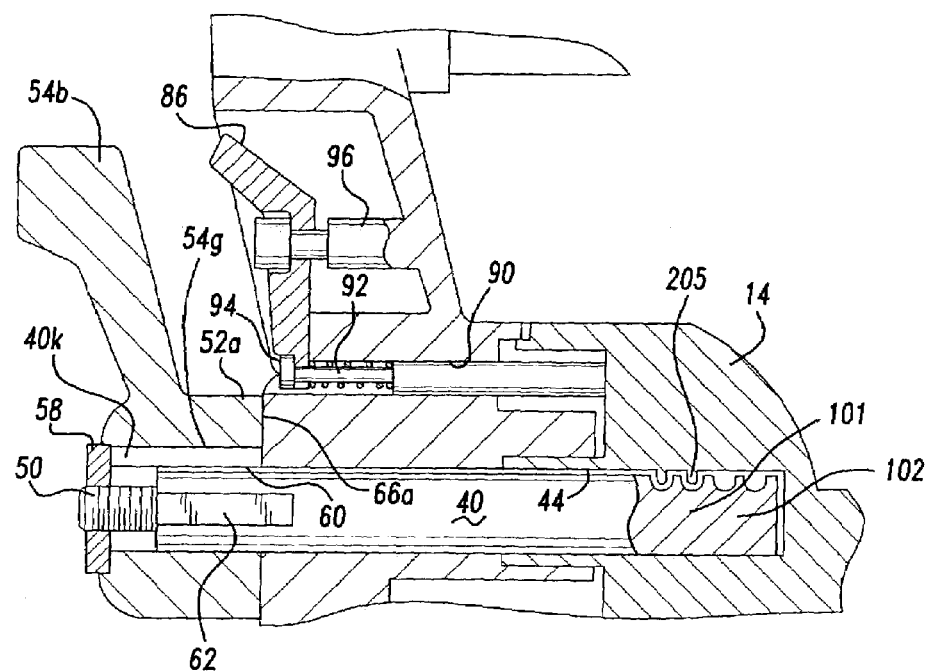
FIG. 18 is a cross-sectional side view of an eighth embodiment of the bevel stop mechanism.
Figure 19:
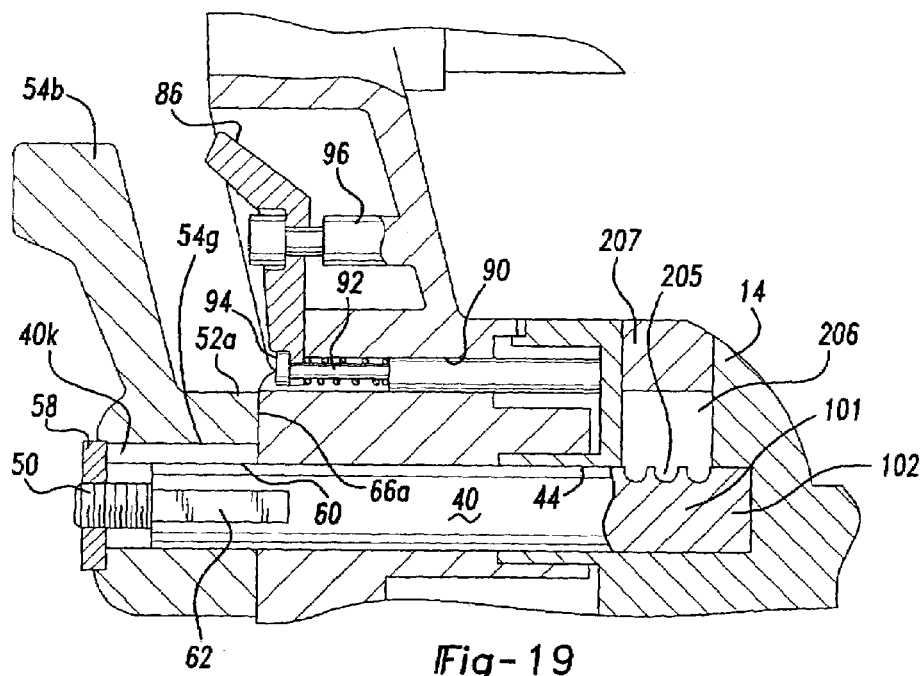
FIG. 19 is a cross-sectional side view of a ninth embodiment of the bevel stop mechanism.

FIGS. 17 to 19 illustrate different embodiments of locking mechanism 30. Unlike the previous embodiments, shaft 40 is not fixedly attached to the table assembly 14. Instead, the shaft 40 is rotatable. In addition, the handle 54b is not slidingly and rotatably positioned on shaft 40. Instead, handle 54b is fixedly attached to or integrated with shaft 40 at the outer end of the shaft. Preferably a key 40k is provided on the shaft 40 to mesh with a groove 54g in the handle 54b, or vice versa, to ensure rotational movement of both shaft 40 and handle 54b. Thus, if the operator rotates the handle 54b, the shaft 40 moves accordingly.

Handle 54b may be fixedly attached to shaft 40 via a locknut 58.

Furthermore, handle 54b does not have camming surfaces 66 contacting the camming surfaces of cam 52' like prior embodiments. This is because handle 54b does not contact cam 52' as cam 52' is not disposed between handle 54b and the support housing 32. Instead, a cam end 200 is fixedly attached to or integrated with the shaft 40 at its other end, as shown in FIG. 17. Preferably a key 40kk is provided on the shaft 40 to mesh with a groove 200g in the cam end 200, or vice versa, to ensure rotational movement of both shaft 40 and cam end 200. Thus, if the operator rotates the handle 54b, the shaft 40 and cam end 200 move accordingly.

As mentioned above, cam 52' is not disposed between handle 54b and support housing 32, as in prior embodiments. Instead, cam 52' is disposed in table assembly 14 to contact cam end 200. Preferably, cam 52' is integrated with table assembly 14. Cam 52' preferably does not rotate. Cam 52' may include an angular camming surface 64' having a plurality of ramps which is located on the radial surface of cam 52 which is nearest cam end 200. Camming surface 64 is designed to mate with a camming surface 200s on cam end 200 as will be described later herein.

When angular camming surface 64 and angular camming surface 200s are in full contact with each other as shown in FIG. 17, support housing 32 is free to pivot on shaft 40 to change the bevel angle of saw blade 18. Once the desired bevel angle has been set, handle 54b is rotated. Rotation of handle 54b (and thus shaft 40 and cam end 200) mis-aligns camming surfaces 64 and 200s pushing shaft 40 towards table assembly 14. Support housing 32 contacts handle 54b and table assembly 14 and continued rotation of handle 54b forces support housing 32 into table assembly 14 locking the two components together. The locking of the two components together can be accomplished by rotating handle 54b in either a clockwise or a counter clockwise direction on order to misalign camming surfaces 64 and 200s. This bi-directional locking ability of handle 54b simplifies the adjustment of the bevel angle on opposite sides of center.

Persons skilled in the art will recognize that the different camming surfaces to be used on handle 54 and cam 52 in the different embodiments disclosed in the parent applications may also be used on cam end 200 and cam 52' to obtain the result described above. Again, persons skilled in the art are referred to the parent applications, which are hereby incorporated by reference.

FIGS. 18 and 19 also illustrate different embodiments of the bevel lock mechanism, where like numerals refer to like parts with like functions. In these embodiments, the shaft 40 is rotatable and handle 54b is fixedly attached to or integrated with shaft 40 at the outer end of the shaft. Preferably a key 40k is provided on the shaft 40 to mesh with a groove 54g in the handle 54b, or vice versa, to ensure rotational movement of both shaft 40 and handle 54b. Thus, if the operator rotates the handle 54b, the shaft 40 moves accordingly.

A double screw portion 102 is provided at the other end of the shaft 40. Again, as in FIG. 13, on one side of the double screw portion 102, a set of threads 101a are disposed thereon in a first orientation. In addition, on the other side of the double screw portion 102, a second set of threads 101b are disposed thereon in a second orientation. The threads 101a and 101b intersect to form V-shaped threads 101. Preferably, the resulting threads 101 will have a low pitch, so that more travel along the axis of the rod can be obtained with a smaller amount of rotation.

The table assembly 14 has protrusions 205 to engage the threads 101, as shown in FIG. 18. These protrusions 205 slide along the threads 101, as the handle 54b (and thus shaft 40 and screw portion 102) is rotated, the handle 54b and shaft 40 travel towards table assembly 14. This in turn forces the handle 54b towards the support housing 32, thus clamping the support housing 32 in place between handle 54b and table assembly 14. Accordingly, the rotational motion of handle 54a is translated into a linear motion, causing the clamping action.

As shown in FIGS. 18 and 19, the protrusions 205 preferably match the profile of the threads 101, allowing travel along threads 101. Accordingly if the thread 101 is rounded, the protrusions 205 are preferably rounded. Persons skilled in the art will nevertheless recognize that any profile of protrusions 205 will be acceptable so long as the protrusions 205 can slide along the threads 101.

Preferably, the protrusions 205 are disposed on a thread engaging portion 206, as shown in FIG. 19, held in place by a plug 207. Accordingly, in order to install shaft 40, an operator need only the shaft 40 into the table assembly 14 and insert the thread engaging portion 206, so that it engages the threads 101. The operator can then insert the plug 207 to hold the thread engaging portion 206 in place.

The above detailed description describes different embodiments of the present invention. Persons skilled in the art may recognize other alternatives to the means disclosed herein, such as using a knob instead of handle 54. However, all these additions and/or alterations are considered to be equivalents of the present invention.

What is claimed is:

1. A device for performing working operations on a workpiece, said device comprising:
   a base;
   a table rotatably disposed on the base about a substantially vertical axis;
   a shaft disposed on said table, said shaft having an axis;
   a support housing supporting a motor and a working tool driven by said motor, the working tool being movable about a substantially horizontal axis between a first position and a lower second position, said support housing being disposed on said shaft adjacent to said table, said support housing being axially movable along said shaft and being laterally pivotable about an axis of rotation; and
   a locking mechanism for locking the support housing at a predetermined lateral position, wherein said locking mechanism comprises a handle disposed on said shaft, said handle being rotatable in two directions with respect to said table, such that, upon rotation of said handle in both directions from a neutral position, the handle urges said support housing into contact with said table.

2. The device according to claim 1, wherein the shaft is rotatable relative to the table.

3. The device according to claim 2, said locking mechanism further comprises a first camming surface disposed on the table.

4. The device according to claim 3, wherein said shaft comprises a second camming surface engaging the first camming surface.

5. The device according to claim 2, wherein the shaft has a first surface having a first thread disposed thereon in a first orientation, and a second surface having a second thread disposed thereon in a second orientation, said first and second thread intersect forming a V-shaped thread.

6. The device according to claim 5, wherein the table comprises at least one protrusion slidable along said first and second threads.

7. The device according to claim 1, wherein the shaft axis is substantially parallel to the axis of rotation.

8. The device according to claim 1, wherein the shaft axis corresponds to the axis of rotation.

9. The device according to claim 1, wherein the handle is fixedly disposed on said shaft.

10. The device according to claim 1, wherein said device is a compound miter saw.

* * * * *